United States Patent
Meyer et al.

(10) Patent No.: US 7,261,012 B2
(45) Date of Patent: Aug. 28, 2007

(54) GEAR DRIVE UNIT WITH SPEED MEASUREMENT

(75) Inventors: Marcus Meyer, Karlsbad (DE); Stefan Reck, Buehl (DE); Juergen Herp, Buehl (DE); Markus Kliffken, Pfaffenhofen (DE); Dietmar Schaible, Holzgerlingen (DE); Stefan Kotthaus, Sinzheim (DE); Frank Moskob, Karlsruhe (DE); Thomas Huck, Rheinmuenster (DE); Michael Soellner, Lichtenau (DE); Martin Hager, Moneville (FR)

(73) Assignee: Robert Bosch GmbH, Stuttgart (DE)

( * ) Notice: Subject to any disclaimer, the term of this patent is extended or adjusted under 35 U.S.C. 154(b) by 410 days.

(21) Appl. No.: 10/380,592

(22) PCT Filed: Jul. 6, 2002

(86) PCT No.: PCT/DE02/02482

§ 371 (c)(1),
(2), (4) Date: Jun. 26, 2003

(87) PCT Pub. No.: WO03/008747

PCT Pub. Date: Jan. 30, 2003

(65) Prior Publication Data

US 2004/0007067 A1    Jan. 15, 2004

(30) Foreign Application Priority Data

Jul. 18, 2001   (DE)   ................. 101 34 937

(51) Int. Cl.
*F16H 61/32*   (2006.01)
*E05F 15/00*   (2006.01)
*B62D 15/02*   (2006.01)

(52) U.S. Cl. ................. 74/421 A; 74/425; 324/207.22; 324/207.25

(58) Field of Classification Search ............... 74/89.14, 74/425; 324/207.2, 207.21, 207.22, 207.25
See application file for complete search history.

(56) References Cited

U.S. PATENT DOCUMENTS

| | | | | |
|---|---|---|---|---|
| 1,942,689 A * | 1/1934 | Erbach | ............................ | 52/27 |
| 4,567,783 A * | 2/1986 | Hart | ............................ | 74/425 |
| 4,627,300 A * | 12/1986 | Stoy | ............................ | 74/89.28 |
| 5,267,625 A * | 12/1993 | Shimizu | ...................... | 180/443 |
| 5,636,071 A | 6/1997 | Mochizuki | | |
| 5,723,977 A * | 3/1998 | Moretti et al. | .......... | 324/207.22 |
| 5,825,178 A | 10/1998 | Abendroth | | |
| 6,058,553 A * | 5/2000 | Tsuyama et al. | ........ | 15/250.003 |
| 6,072,254 A * | 6/2000 | Heib et al. | ................ | 310/68 B |
| 6,163,125 A * | 12/2000 | Bernauer et al. | ........... | 318/626 |
| 6,288,534 B1 * | 9/2001 | Starkweather et al. | ... | 324/207.2 |
| 6,563,305 B1 * | 5/2003 | Sorsa et al. | ............... | 324/207.2 |
| 6,657,346 B2 * | 12/2003 | Pan et al. | ...................... | 310/99 |

FOREIGN PATENT DOCUMENTS

| | | |
|---|---|---|
| DE | 198 54 038 A | 5/2000 |
| DE | 199 35 195 C | 11/2000 |
| EP | 0 865 148 A1 | 9/1998 |
| JP | 57-108458 * | 7/1982 |
| JP | 8-226346 * | 9/1996 |

* cited by examiner

*Primary Examiner*—William C. Joyce
(74) *Attorney, Agent, or Firm*—Michael J. Striker

(57) ABSTRACT

Gearset-drive unit (10), in particular for use in motor vehicles, comprising a drive wheel (16) that meshes with a driven wheel (22), wherein a sensor wheel (26) with a position sensor (36) that interacts with a sensor (42) to detect speed meshes with the drive wheel (16) or the driven wheel (22).

11 Claims, 2 Drawing Sheets

GEAR DRIVE UNIT WITH SPEED MEASUREMENT

BACKGROUND OF THE INVENTION

The invention concerns a gearset-drive unit with speed detection, in particular for use in a motor vehicle, according to the general class of the independent claims.

A motor gearset-drive unit for adjusting equipment parts of motor vehicles with a commutator motor was made known in EP 0 865 148 A1. According to said publication, a substantially pot-shaped motor housing contains a motor armature with an armature shaft extending out of the motor housing. The armature shaft is supported between the motor housing and the gearset housing by means of a spherical cap bearing. A collector and a ring magnet are located on the armature shaft between the motor armature and the spherical cap bearing. The outer circumference of the ring magnet is magnetized in alternating north and south poles. The changing magnetic field is detected by two Hall-element sensors offset from each other by 90°, and it is evaluated by control electronics located on an electronic printed-circuit board. The electronic printed-circuit board extends into the motor housing into the immediate vicinity of the ring magnet. This arrangement of the electronic printed-circuit board within the motor housing or in the region of the brush holder is very complicated and inflexible. In addition, the brush sparking interferes with the speed sensors.

ADVANTAGES OF THE INVENTION

The device according to the invention having the features of the independent claims has the advantage that the speed sensors can be located entirely outside of the motor housing. This eliminates the substantial design-related effort required to locate the electronic printed-circuit board—with the sensors located on it—within the motor housing. By locating the electronic printed-circuit board in the region of the gearset housing, the formats of the electronic printed-circuit board can be designed smaller and simpler. Additionally and advantageously, the gearset space can be easily sealed off from the collector space, since the electronic printed-circuit board no longer extends into the collector space.

Since the sensor wheel can be located at any appropriate point on the drive wheel or the driven wheel, the location of the sensors can be adapted in optimum fashion to the respective housing of the gearset-drive unit. Situating them at a distance from the collector prevents the collector from interfering with the sensors. The fact that the sensor wheel can be positioned anywhere along the drive wheel or the driven wheel makes ideal utilization of space and an ideal design of the gearset-drive unit possible. By eliminating the ring magnets, the construction length of the armature shaft and, therefore, the entire gearset-drive unit, is reduced. This is particularly significant with regard for applications for seat adjustment or in a sliding sunroof, since the amount of available space is limited in these cases.

In a further exemplary embodiment, the drive wheel or the driven wheel is designed to function simultaneously as sensor wheel. If the sensor wheel is integrated in the drive wheel, for example, the exposed end face of the sensor wheel is also the exposed end of the armature shaft. If, on the other hand, the driven wheel comprises a position sensor, an additional sensor wheel is not required, either, which saves space and reduces the number of components required.

Advantageous further developments of the device according to claims 1 and 2 are possible as a result of the features listed in the dependent claims. It is particularly favorable, for example, when the drive wheel is designed as a worm located on the armature shaft. The sensor wheel—designed as a spur gear, in particular a worm gear—can then mesh at any point with the driven wheel designed as worm gear, or it can mesh directly with the worm. The gear ratio with respect to the sensor wheel (number of teeth) can be selected depending on the desired level of sensitivity of the speed sensors. If the sensor wheel meshes with the worm on the side opposite the worm gear, the armature shaft has additional support at this point.

The use of a magnet as position sensor is advantageous, since it can be installed on the sensor wheel in simple fashion, or the sensor wheel comprises material that is easy to magnetize. A two-pole magnet is particularly favorable, although a multipole arrangement can be produced easily, in order to increase the resolution of the speed measurement. It is preferable to install/magnetize a two-pole magnet, however, since this design is much more cost-effective than producing a ring magnet.

Locating the position sensor on the exposed end face of the sensor wheel allows for greater flexibility in terms of the arrangement of the corresponding sensor systems. Regardless of whether inductive, optical, or magnetic sensors are used, they are not limited to a radial arrangement, as is the case with ring magnets on the armature shaft. Instead, the sensors can be located directly along the exposed end face of the sensor wheel, which results in substantially more installation space being made available for the sensors.

It is particularly cost-effective and simple in terms of handling to use Hall-effect sensors that can be located radially relative to the sensor wheel or in the same plane as said sensor wheel. This design is particularly advantageous for applications in which high-resolution speed detection is not required (incremental systems).

For application in highly-precise absolute-angle measuring systems, it is particularly advantageous to use magnetoresistive elements (GMR, AMR) as sensors. Compared to the incremental ring magnet system, in which the sensor can only detect a change in polarity, the magnetoresistive element directly measures the alignment of the magnetic field, e.g., of a magnetic dipole. This results in a substantially higher resolution, which allows more exact adjustments to be carried out, e.g., for adjustment paths requiring a high level of exactitude. For longer adjustment paths, the full revolutions of the sensor wheel are registered incrementally, and the subdivision of one revolution of a sensor wheel is detected absolutely. The magnetoresistive element (GMR, AMR) can be located, favorably, in the same plane as the end face of the sensor wheel comprising at least one magnetic dipole.

It is particularly advantageous when the sensor system comprises a device with which an angle division of one revolution of the sensor wheel can be selected arbitrarily. With this, a design can be attained with which the number of edges that the sensor system generates during one revolution of the sensor wheel can be adjusted arbitrarily. Variable division of the angle of rotation can be realized using electronic circuitry or software based on the absolute rotation angle measurement. This makes it possible to optimally adapt the resolution of the speed measurement to the specific application, and it can be varied during operation.

It is particularly favorable to locate the sensor wheel on the side of the worm opposite the driven wheel, because the sensor wheel then also provides support for the armature shaft. The armature shaft is usually permanently supported in the pole well and in the transition region between motor housing and gearset housing, e.g., by means of a spherical cap bearing. The exposed end of the armature shaft in the gearset housing is supported by means of a bearing journal, for example, to prevent the armature shaft from shifting if increased load moment occurs. It is relatively costly, on the one hand, to integrate such a bearing journal, and, on the other, a mounting of this type often results in vibrations and undesired noises. Since the machining of the worm tooth system is very exact in the region where it meshes with the driven wheel, arranging the sensor wheel as support gear on the opposite side results in a very exact and quiet mounting. As a result, a trouble-free meshing of the teeth of the worm and driven wheel is ensured, damage to the teeth is reliably prevented, and said teeth are reliably prevented from skipping.

It is favorable when the axle of the sensor wheel is inserted directly in the gearset housing for support. This makes simple assembly possible with few additional components. The bearing forces that occur are advantageously transferred directly to the gearset housing.

Due to the fact that no sensors are located in the motor housing, and the electronic printed-circuit board does not extend into the motor housing, said motor housing can be effectively sealed off from the gearset housing in simple fashion to prevent grease from entering the collector space. As a result, the electronic printed-circuit board need not be sealed off from the motor housing in a manner that is costly and in which the process is crucial. The electronic printed-circuit board can be located entirely within the gearset housing and/or an electronics housing, and it can comprise a smaller, simpler format.

SUMMARY OF THE DRAWINGS

Two exemplary embodiments of a device according to the invention are presented in the drawings and described in greater detail in the subsequent description.

DESCRIPTION OF THE PREFERRED EMBODIMENTS

Figure 1:
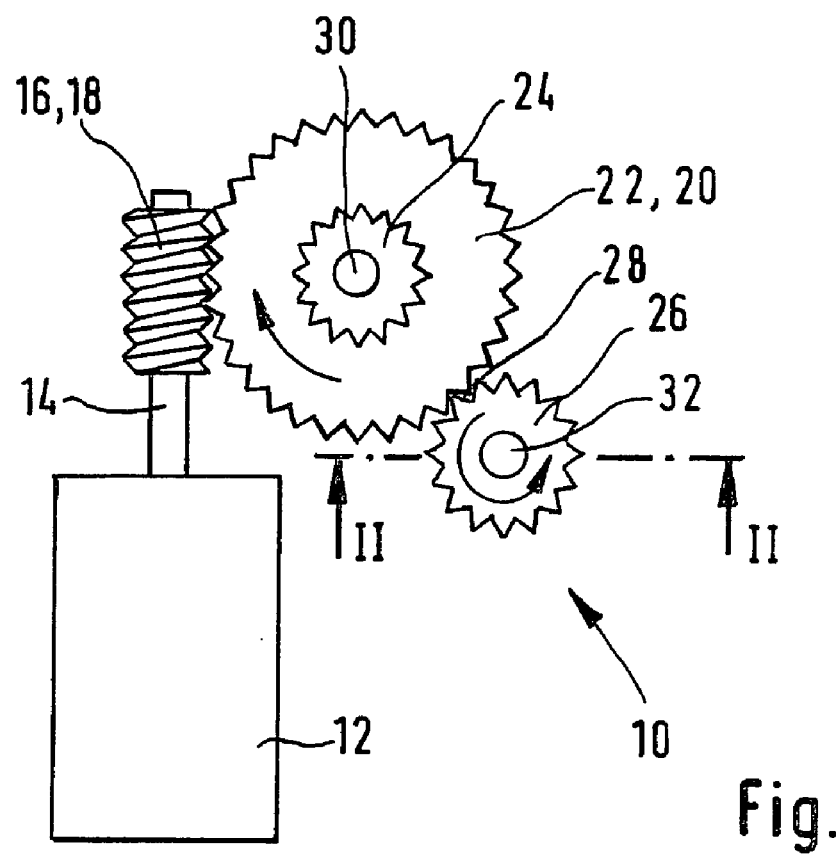
FIG. 1 is a schematic representation of a device according to the invention.
Figure 2:
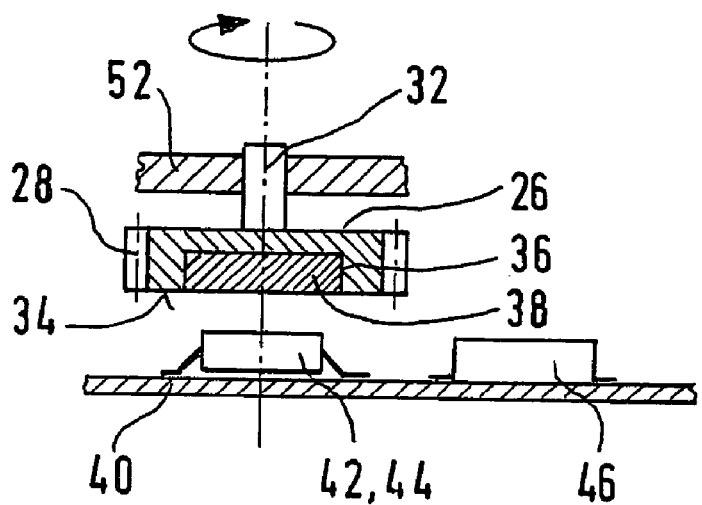
FIG. 2 is a cut along the line II-II in FIG. 1.

The first exemplary embodiment of a device according to the invention shown in FIGS. 1 and 2 comprises an electric motor 12 with an armature shaft 14 on which a worm 18, as the drive wheel 16, is located in torsion-proof fashion. The worm 18 meshes with a driven wheel 22 designed as worm gear 20. A driven pinion 24 is integrally molded in torsion-proof fashion on the worm gear 20, via which said driven pinion torque can be transferred. To detect motor speed or rotational speed, a sensor wheel 26 is enmeshed with the worm gear 20 via a tooth system 28. The worm gear 20 as well as the sensor wheel 26 rotate on two axes (worm gear axis 30, sensor wheel axis 32), each of which is located in torsion-proof fashion in a not-further-shown housing 52 of the gearset-drive unit 10. FIG. 2 shows a cut through the sensor wheel 26, whereby its axle 32 is secured in the not-further-shown housing 52 (in the top of FIG. 2). The sensor wheel 26 comprises an exposed end face 34 on which a magnetic dipole 38, as position sensor 36, is magnetized. A sensor 42 is located on a board 40 directly opposite the position sensor 36, which said sensor is designed as magnetic resistive element (GMR, AXR) 44 in this exemplary embodiment. The sensor 42 is interconnected with an evaluation device 46 on the board 40 that emits a sequence of signal edges as the output signal of the speed detection. In contrast to a Hall-effect sensor 43, the magnetoresistive element (GMR, AXR) 44 is capable not only of detecting the polarity change of a magnetic field, it is also capable of measuring the absolute rotation angle of the rotating magnetic dipole 38. It is therefore possible to adjust the resolution of the speed signal arbitrarily by using the evaluation device 46 to adjust the angle division of the sensor wheel 26, i.e., the number of signal edges per revolution. This can be carried out within the evaluation device 46 using hardware means, i.e., electronic circuity, or by using software means. In contrast to conventional speed detection using Hall-effect sensors 43 and a ring magnet 37 located on the armature shaft—in the case of which, sensitivity can be changed only by the number of pole divisions of the ring magnet 37—in the exemplary embodiment according to the invention, the sensitivity of speed detection can even be changed during operation. This makes it possible to very easily adapt the gearset-drive unit 10 to the respective application.

Figure 3:
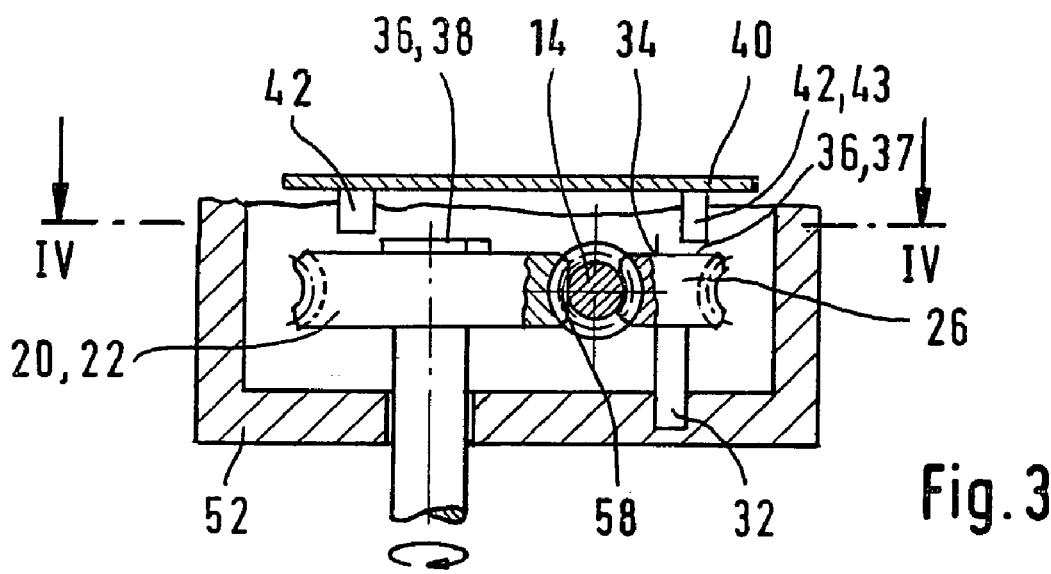
FIG. 3 is a schematic representation of a further exemplary embodiment in a sectional view.
Figure 4:
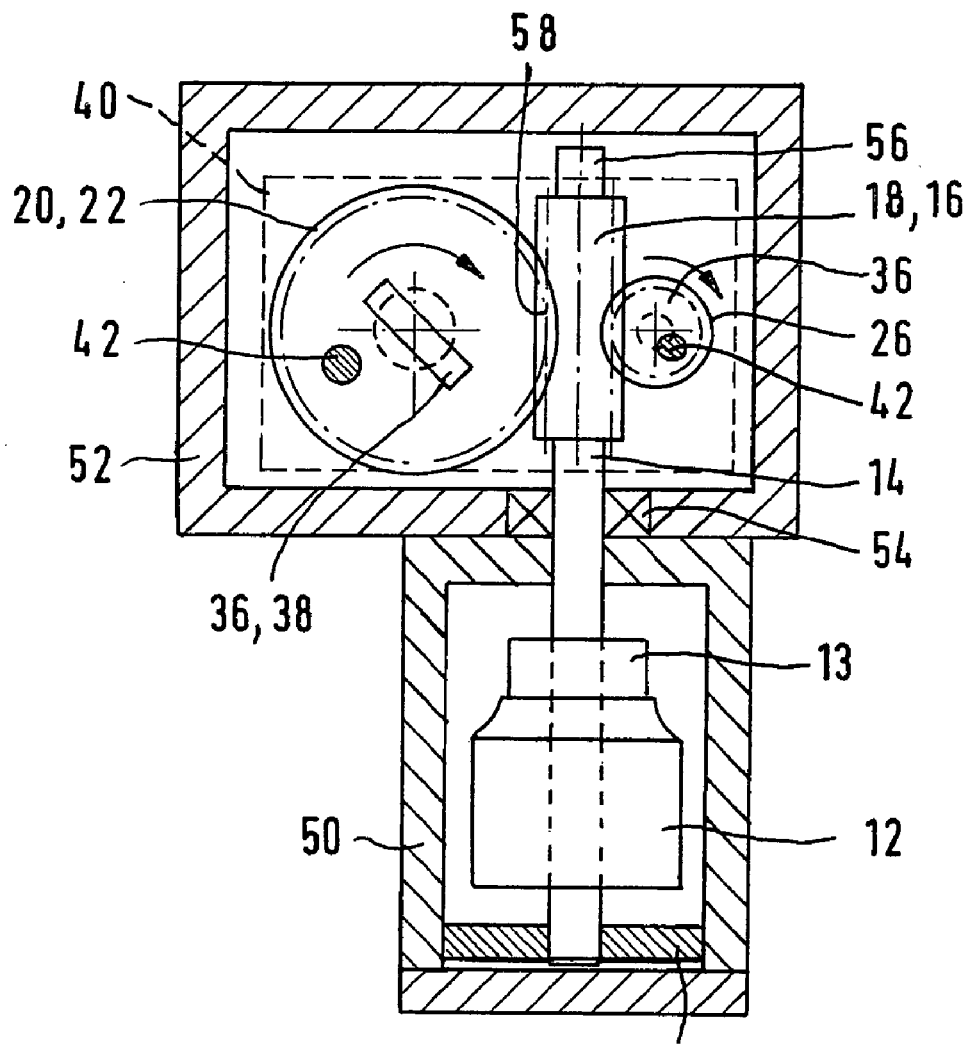
FIG. 4 is a cut along line IV-IV in FIG. 3.

FIGS. 3 and 4 show a further exemplary embodiment of a gearset-drive unit 10 according to the invention, in the case of which the sensor wheel 26 serves to support the armature shaft 14. The gearset-drive unit 10 comprises a motor 12 with a collector 13 and a motor housing 50 enclosing them, as well as a gearset housing 52 that encloses the gearset as well as all of the speed sensors. The armature shaft 14 is permanently supported, on the one hand, in an armature bearing 48 in the bottom of the motor housing 50 and in a roller bearing 54 between the motor housing 50 and the gearset housing 52. The exposed end 56 of the armature shaft 14 is also supported, at least radially, by the arrangement of the sensor wheel 26 and the worm gear 20 opposite each other. This arrangement ensures that the armature shaft 14 cannot become disengaged radially from the tooth mesh 58 with the worm gear 20. This applies for the case, in particular, when the worm gear 20 is stopped abruptly or it deforms slightly. Damage to the worm gear 20 is hereby prevented, and the tooth mesh 58 is prevented from skipping. An electronic printed-circuit board 40 is indicated by dashed lines in FIG. 4. A Hall-effect sensor 43, as sensor 42, is located on said electronic printed-circuit board opposite the end face 34 of the sensor wheel 26. The sensor wheel 26 is produced as an injection-molded plastic part composed (at least partially) of plastoferrite that is magnetized to form a multipole ring magnet 37. The Hall-effect sensor 43 located in the immediate vicinity of this ring magnet 37 incrementally detects the change in polarity of the ring magnet 37. The resolution of the speed detection is therefore determined by the number of pole pairs of the ring magnet 37 and by the number of teeth on the sensor wheel 26.

As a variation of the exemplary embodiment, the driven wheel 22 also comprises a position sensor 36, which is integrally molded on the end face of the driven wheel as a simple magnetic dipole 38 in this case. The driven wheel 22 thereby also takes on the function of a sensor wheel 26, since a sensor 42 is also located on the board 40, which said sensor detects the rotation of the magnetic dipole 38. This is illustrated in FIG. 3. As shown in FIG. 4, all of the sensors are located within the gearset housing 52. As a result, it is not necessary for the board 40 to extend into the motor housing 50 toward the collector 13, as is typically the case with previous gearset-drive units 10 with speed detection. For this reason, the gearset housing 52 is sealed off from the motor housing in a clean fashion. This prevents the gearset lubricating grease from penetrating the motor housing 50.

In further variations of the exemplary embodiments, the exact position of the sensor wheel 26 along the drive wheel 16, in particular a worm 18, or the driven wheel 22 can be varied in such a fashion that various structural designs of the motor can be realized while making optimum use of space. In addition, the number of teeth on the sensor wheel 26 can be selected accordingly in order to adapt the sensors to the corresponding requirements. The design of the drive wheel 22 as sensor wheel 26 or further combinations of individual features according to the invention are further exemplary embodiments of the invention as well.

What is claimed is:

1. A gearset-drive unit (10) for use in a motor vehicle, comprising a drive wheel (16) that meshes with a driven wheel (22), wherein a sensor wheel (26) with a position sensor (36) that interacts with a sensor (42) to detect speed or rotational speed meshes with the drive wheel (16) or the driven wheel (22), wherein the sensor wheel has an axis of rotation, and wherein the position sensor is formed from plastoferrite that extends through the sensor wheel axis of rotation.

2. The gearset-drive unit (10) according to claim 1, wherein the drive wheel (16) is designed as a worm (18) located on the armature shaft (14) of an electric motor, and the sensor wheel (26) is designed as a spur gear in the form of a worm gear.

3. The gearset-drive unit (10) according to claim 1, wherein the position sensor (36) is located on an exposed end face (34) of the sensor wheel (26).

4. The gearset-drive unit (10) according to claim 1, wherein the sensor (42) generates signal edges and comprises a device (46) with which the number of signal edges that the sensor (42) generates during one rotation of the sensor wheel can be selected arbitrarily.

5. The gearset-drive unit (10) according to claim 1, wherein the gearset-drive unit (10) comprises a gearset housing (52), and the sensor wheel (26) is situated on an axle (32) that is inserted directly in the wall of the gearset housing (52).

6. The gearset-drive unit (10) according to claim 1, wherein the gearset-drive unit (10) comprises a motor housing (50) enclosing an electric motor (12) including a collector (13) and the sensor wheel (26) and the sensor (42) are located in the gearset housing (52), which said gearset housing is sealed off from the motor housing (50).

7. The gearset-drive unit (10) according to claim 1, wherein the sensor wheel (26) is designed as armature shaft support and engages on the side of the drive wheel (16) formed as a worm (18), opposite the driven wheel (22).

8. A gearset-drive unit (10) for use in a motor vehicle, comprising a drive wheel (16) that meshes with a driven wheel (22), wherein the drive wheel (16) or the driven wheel (22) is designed as a sensor wheel (26) with a position sensor (36) that interacts with a sensor (42) to detect speed, wherein the sensor wheel has an axis of rotation, and wherein the position sensor is formed from plastoferrite that extends through the sensor wheel axis of rotation.

9. The gearset-drive unit (10) according to claim 8, wherein the sensor (42) generates signal edges and comprises a device (46) with which the number of signal edges that the sensor (42) generates during one rotation of the sensor wheel can be selected arbitrarily.

10. The gearset-drive unit (10) according to claim 8, wherein the sensor wheel (26) is designed as armature shaft support and engages on the side of the drive wheel (16) formed as a worm (18), opposite the driven wheel (22).

11. A gearest-drive unit for use in a motor vehicle, comprising a drive wheel, a driven wheel that meshes with the drive wheel, and either (a) the drive wheel or the driven wheel is designed as a sensor wheel with a position sensor that interacts with a sensor to detect speed or rotational speed, or (b) a separate sensor wheel distinct from the drive wheel or the driven wheel is provided with a position sensor that interacts with a sensor to detect speed or rotational speed, and wherein the sensor wheel has an axis of rotation and an end face, and wherein the position sensor is formed from plastoferrite that extends over the sensor wheel end face and intersects the sensor wheel axis of rotation.

* * * * *